United States Patent [19]

Uegami

[11] Patent Number: 5,804,522
[45] Date of Patent: Sep. 8, 1998

[54] HARDENED ALUMINA MATERIAL

[76] Inventor: Kenjiro Uegami, 8-17, Nishijuku 3-chome, Mino-shi Osaka, Japan

[21] Appl. No.: 524,645

[22] Filed: Sep. 8, 1995

[30] Foreign Application Priority Data

Sep. 10, 1994 [JP] Japan .................................. 6-242123

[51] Int. Cl.⁶ .................................................. C04B 35/10
[52] U.S. Cl. .............................. 501/127; 501/153; 51/309
[58] Field of Search ..................................... 501/127, 134, 501/153; 51/307–309

[56] References Cited

U.S. PATENT DOCUMENTS

| | | | |
|---|---|---|---|
| 4,623,364 | 11/1986 | Cottringer et al. | 51/309 |
| 4,786,292 | 11/1988 | Janz et al. | 51/309 |
| 5,076,815 | 12/1991 | Kunz et al. | 501/134 |
| 5,114,891 | 5/1992 | Kunz et al. | 501/127 |
| 5,304,226 | 4/1994 | Hasegawa et al. | 501/127 |
| 5,312,789 | 5/1994 | Wood | 501/127 |
| 5,403,795 | 4/1995 | Koyama et al. | 501/127 |
| 5,489,318 | 2/1996 | Erickson et al. | 501/127 |

OTHER PUBLICATIONS

Metals Handbook, Ninth Edition, pp. 90–91, Jun. 1985.
Physics (Part I), Resnick et al. p. 30, 1966.
JIS Z 2244 Document (3 Pages) 1992.

*Primary Examiner*—Deborah Jones
*Attorney, Agent, or Firm*—Michael D. Bednarek; Kilpatrick Stockton LLP

[57] ABSTRACT

The disclosure refers to the art of remarkably increasing the hardness of alumina materials, such as alumina abrasives, alumina ceramics or aluminum oxide single crystal (sapphire), containing aluminum oxide ($Al_2O_3$) as the main component, or the hardness of products using the same.

The alumina material is partially or wholly hardened to have a micro-Vickers hardness of no less than 2600 kgf/mm2 (under a test load of 300×9.807 mN) by inclusion of an oxide or fluoride additive which is solid-soluble in aluminum oxide. Preferable examples of the additive include $TiO_2$ and/or $Y_2O_3$.

5 Claims, 15 Drawing Sheets

Fig. 1

Vickers Hardness of Non-treated Abrasives

Fig. 2

(a) Schematic View of Furnace (b) Schematic View of Furnace Core

Electric Heating-Furnace Used for TiO$_2$-Addition Treatment

Fig. 3

Vicers Hardness of $TiO_2$-Addition Treated and Non-treated Abrasives

Fig. 4

Vickers Hardness of WA Abrasive under Various TiO$_2$-Addition Treatment Conditions

Fig. 5

Hardness Increase Distribution of Cross Section of TiO₂-Addition Treated
White Ceramic Cutting Tool

Wear Progress Curves of TiO$_2$-Addition Treated and Non-treated White Ceramic Cutting Tools

TiO₂ 1273K, 5hx3 Addition Treatment + Heat Treatment Only 1273K, 5h

Surface Hardness Increase of Aluminum Oxide Single Crystal by $TiO_2$-Addition Treatment

Fig. 14

Surface Hardness Increase of Aluminum Oxide Single Crystal Depending on TiO₂-Addition Treatment Condition

Fig. 15

Inner Hardness Distribution of Aluminum Oxide Single Crystal by TiO$_2$-Addition Treatment

HARDENED ALUMINA MATERIAL

BACKGROUND OF THE INVENTION

1. Field of the Invention:

The present invention relates to the art of remarkably increasing the hardness of alumina materials, such as alumina abrasives, alumina ceramics, aluminum oxide single crystal (sapphire) or the like, which contain aluminum oxide ($Al_2O_3$) as the main component as well as the hardness of products prepared by using such a material.

Figure 1:
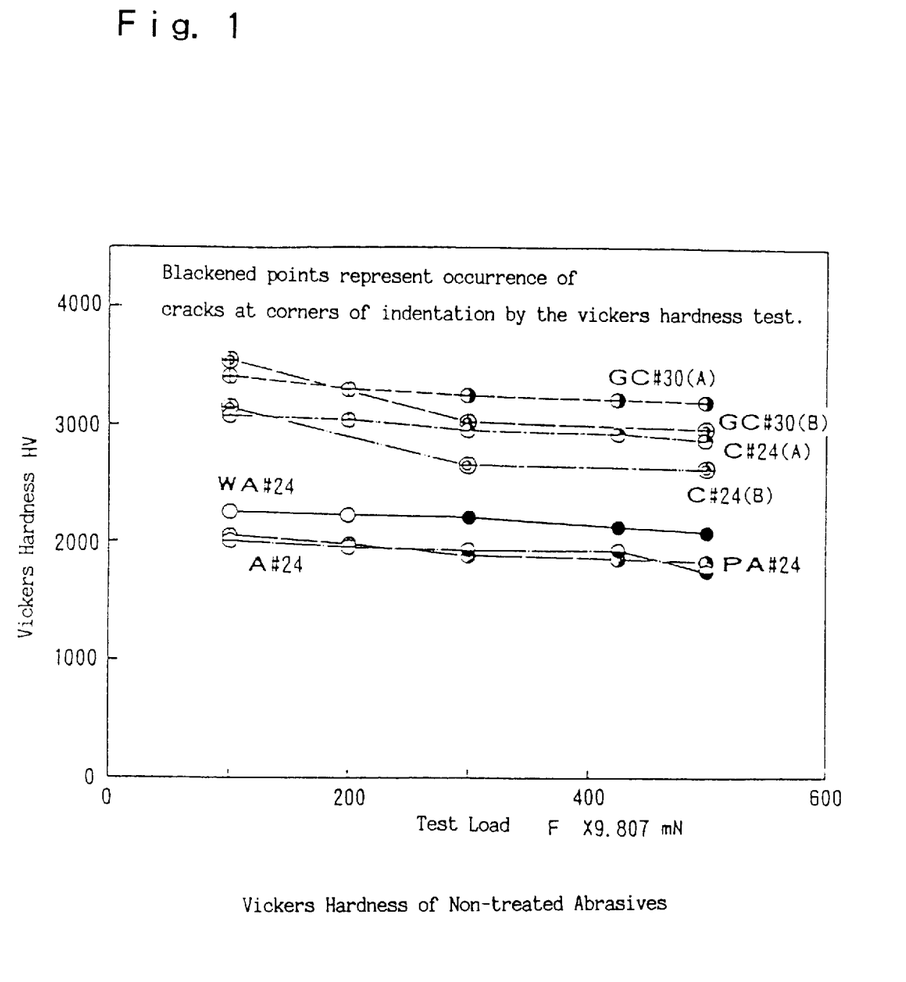
FIG. 1 is a graph showing the Vickers hardness of various kinds of abrasives which are not subjected to the treatment of the present invention.

2. Description of the Related Art:

An example of alumina abrasive having high-purity aluminum oxide ($Al_2O_3$) is the WA abrasive. As shown in FIG. 1, this abrasive has a Vickers hardness of about 2000 kgf/mm2 (see WA# 24 in FIG. 1). FIG. 1 is a graph showing the results obtained by hardness investigation of various abrasive particles. It should be noted that even silicon carbide abrasive particles exhibit a Vickers hardness of only about 3000 kgf/mm2, as indicated by GC#30 (available from A company), GC#30 (available from B company), C#24 (available from A company) and C#24 (available from B company) in FIG. 1.

Therefore, if the hardness of the WA abrasive can be increased, it is applicable to a grinding process which requires the use of harder abrasives, such as C, GC or CBN, containing silicon carbide.

Figure 5:
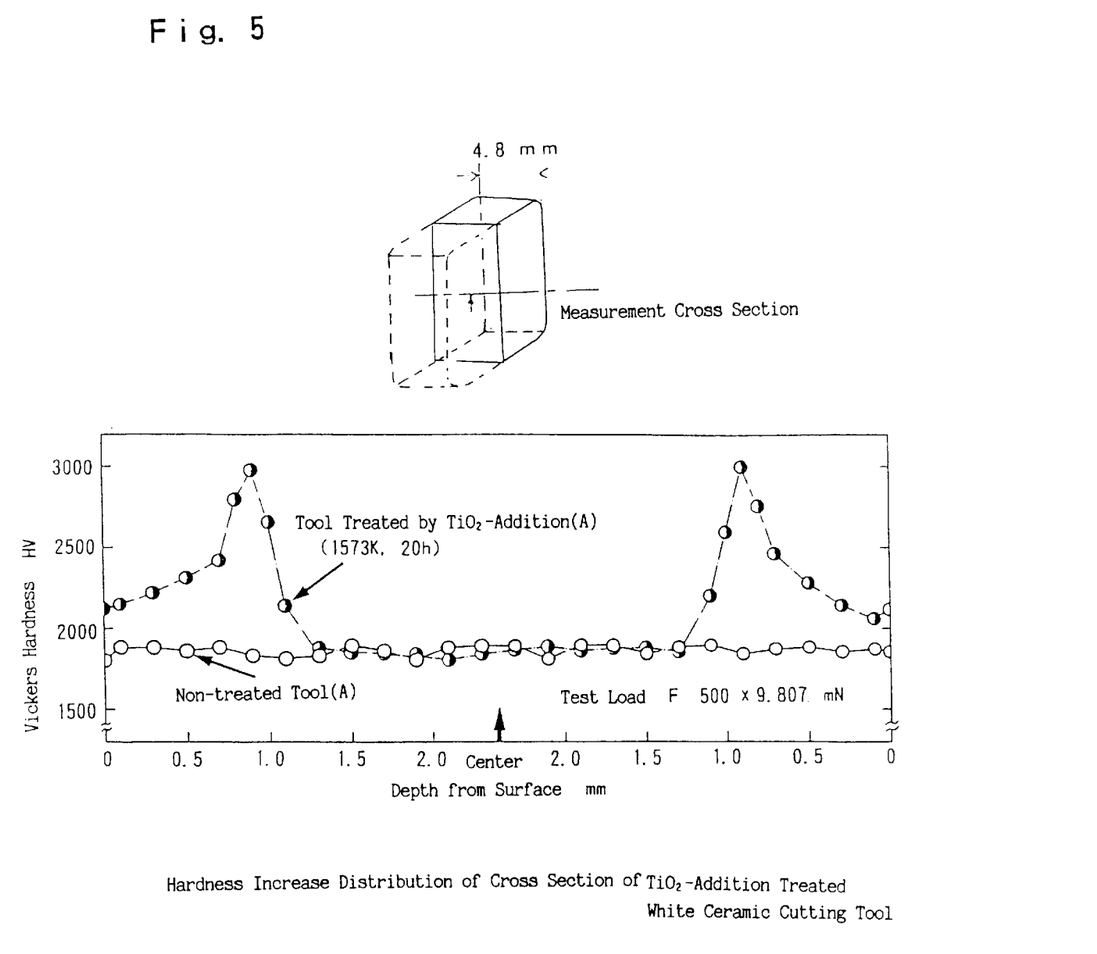
FIG. 5 is a graph showing the cross-sectional hardness distribution of a white ceramic cutting tool treated by $TiO_2$-addition in Example 2 of the present invention, in comparison with the cross-sectional hardness distribution of a non-treated tool.

An alumina ceramic cutting tool (so-called white ceramic tool) made by compacting and sintering fine particles of high purity aluminum oxide ($Al_2O_3$) has a Vickers hardness of only about 1800 kgf/mm2 at best (see the non-treated tool (A) in FIG. 5). In this case, again, if the hardness of such a ceramic tool can be increased, the tool performance can be improved by restraining tool wear progression.

Various kinds of ceramic products made by sintering aluminum oxide material ($Al_2O_3$) have found use not only in the industrial fields but also in various other fields. In the industrial field, the alumina ceramic material is used as a bearing material for example. In general, alumina bearing balls conventionally used for ball bearings have a Vickers hardness of about 1800 kgf/mm2. In this case, again, if the hardness of the ceramic products can be increased, their performance can be improved with respect to abrasion resistance and durability for example, thereby enabling expansion of the applicable fields.

Further, a single crystal of aluminum oxide ($Al_2O_3$) made by Verneul's method for example is used as an artificial jewel such as sapphire, ruby, alexandrite, topaz, aquamarine and spinel when containing additives or impurities. Besides, the single crystal is also used as a laser element, or as an abrasion resistant material for bearings in precision machines and wristwatchs or for record player needles. Because a single crystal artificial sapphire containing a small amount of impurities is colorless and transparent (a colorless single crystal of aluminum oxide ($Al_2O_3$) being also called sapphire), the single crystal is used as a transparent cover plate for a wristwatch for example,.

Figure 13:
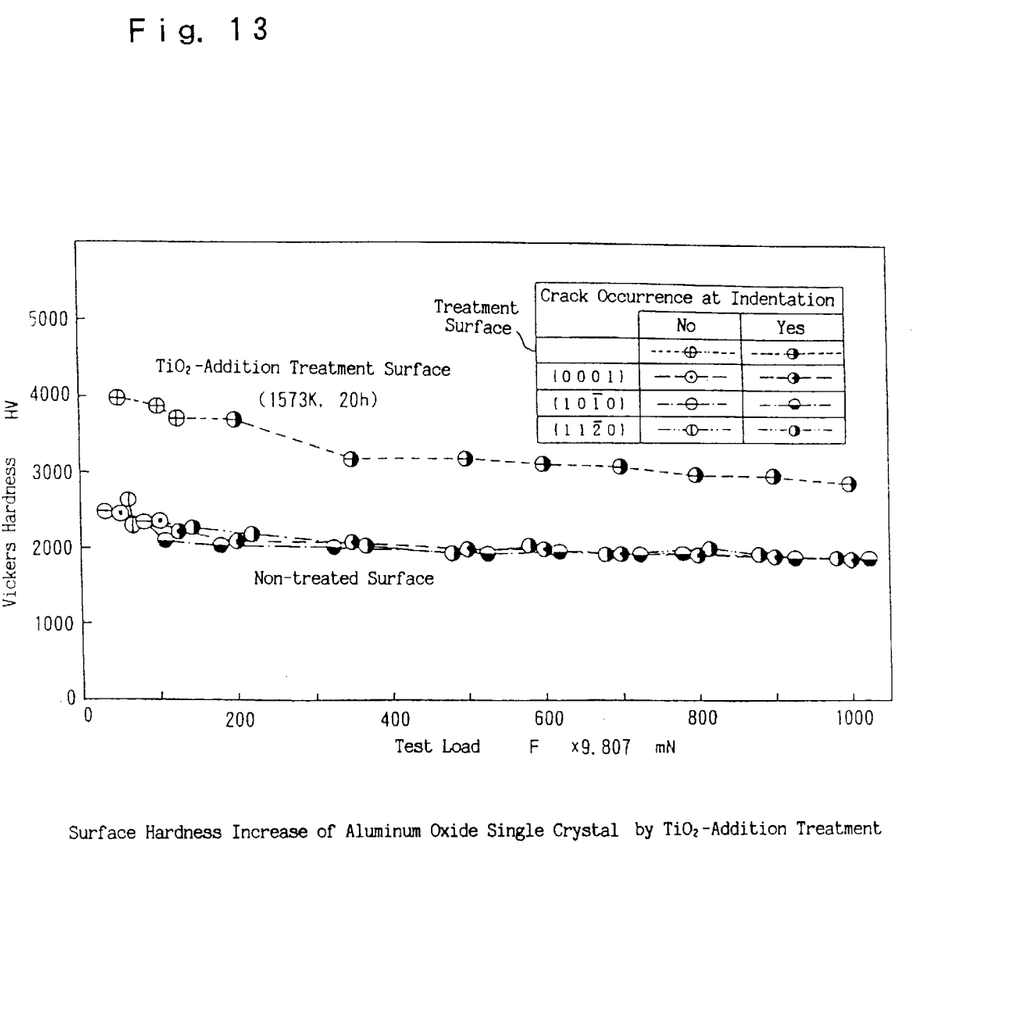
FIG. 13 is a graph showing the surface hardness of a single crystal of aluminum oxide treated by $TiO_2$-addition in Example 4 of the present invention, in comparison with the surface hardness of a non-treated single crystal of aluminum oxide.

In the graph of FIG. 13 showing the results of hardness investigation for sapphire surfaces, the single crystal of aluminum oxide described above exhibits a Vickers hardness of slightly less than 2000 kgf/mm2 with cracks formed at the periphery of an indentation under a test load of 1000 gf, whereas it exhibits a Vickers hardness of slightly less than 2500 kgf/mm2 with no cracks formed at the periphery of a crater under a test load of 50 gf, as indicated by "Non-Treated Surface". Therefore, if the hardness of the single crystal of aluminum oxide can be increased, it is possible to improve the abrasion resistance, damage resistance and durability of the product made of such a single crystal. Further, if a cutting tool is produced by grinding hardened Z sapphire, it becomes possible to use the cutting tool for mirror grinding of ferrous metal which is impossible by a single-crystal diamond cutting tool unless a special measure such as ultrasonic machining is taken.

Therefore, an object of the present invention is to provide an alumina material whose surface or interior is remarkably hardened.

Another object of the present invention is to provide an alumina ceramic material which is remarkably hardened at least at its surface.

Still another object of the present invention is to provide a single crystal of aluminum oxide which is remarkably hardened at least at its surface.

Still another object of the present invention is to provide a method of remarkably hardening at least the surface of alumina material containing aluminum oxide as the main component.

SUMMARY OF THE INVENTION

Under the circumstances described above, the present invention has been completed as a result of various considerations to remarkably increase the hardness of the alumina materials and products described above. The primary concept of the present invention resides in partially or wholly hardening an alumina material containing aluminum oxide as the main component to have a micro-Vickers hardness of no less than 2600 kgf/mm2 (under a test load of 300×9.807 mN) by inclusion of an oxide or fluoride additive which is solid-soluble in aluminum oxide.

The alumina material described above refers to any form of alumina such as abrasive (abrasive particles), sintered ceramic, single crystal of alumina.

The following methods may be applied for adding the additive to the alumina material described above.

① High-purity aluminum oxide ($Al_2O_3$) is mixed with a suitable form of additive or a salt thereof, or with a solution of the additive or its salt which is later thermally decomposed, thereby providing material powder. Then, the material powder is subjected to thermal treatment for causing solid-solution of the additive in the aluminum oxide.

② Given high-purity aluminum oxide powder is mixed with additive powder to provide material powder which is then subjected to thermal treatment for causing solid-solution of the additive in the aluminum oxide.

③ A given alumina-based abrasive material, alumina-based ceramic cutting tool, alumina-based ceramic material, alumina-based ceramic product, or alumina single crystal is brought into embedment in or or into contact with additive powder which is thermally treated to undergo inward diffusion by solid-solution.

An oxide or fluoride which is solid-soluble in aluminum oxide ($Al_2O_3$) has been found suitable as the additive. Examples include $Fe_2O_3$, $SiO_2$, $K_2O$, $MnO$, $Na_2O$, $Li_2O$, $Ga_2O_3$, $Gd_2O_3$, $N_2O_5$, $SO_3$, $Ho_2O_3$, $In_2O_3$, $La_2O_3$, $Li_2O$, $TiO_2$, $Lu_2O_3$, $ZrO_2$, $Y_2O_3$, $Nd_2O_3$, $P_2O_5$, $SrO$, $PbO$, $Sc_2O_3$, $RF_2$, $ZnO$, $Sm_2O_3$, $SnO_2$, $Ta_2O_5$, $Tm_2O_5$, $UO_2$, $V_2O_5$, $Yb_2O_3$, $NaF$, $RbF$, $AlF_3$, $CaF_2$, $NaF$, $LiF$, $MgF_2$, $B_2O_3$, $BaO$, $BeO$, $ThO_2$, $Bi_2O_3$, $CO_2$, $CaO$, $Cr_2O_3$, $K_2O$, $CeO_2$, $Dy_2O_3$, $Er_2O_3$, $Eu_2O_3$. One or more of these additives may form solid-solution with aluminum oxide.

Experiments have shown that the proportion of the additive relative to the aluminum oxide in solid-solution may be no more than 3% by weight, preferably no more than 2.5% by weight, for providing a hardness increase. In this case, the alumina material undergoes a remarkable hardness increase to have a micro-Vickers hardness of at least 2600 kgf/mm2 (under a test load of 300×9.807 mN) and 4000 kgf/mm2 at maximum.

Other aspects and advantages of the present invention will become apparent from the detailed description of the preferred embodiments given with reference to the accompanying drawings.

DETAILED DESCRIPTION OF THE PREFERRED EMBODIMENTS

Figure 2:
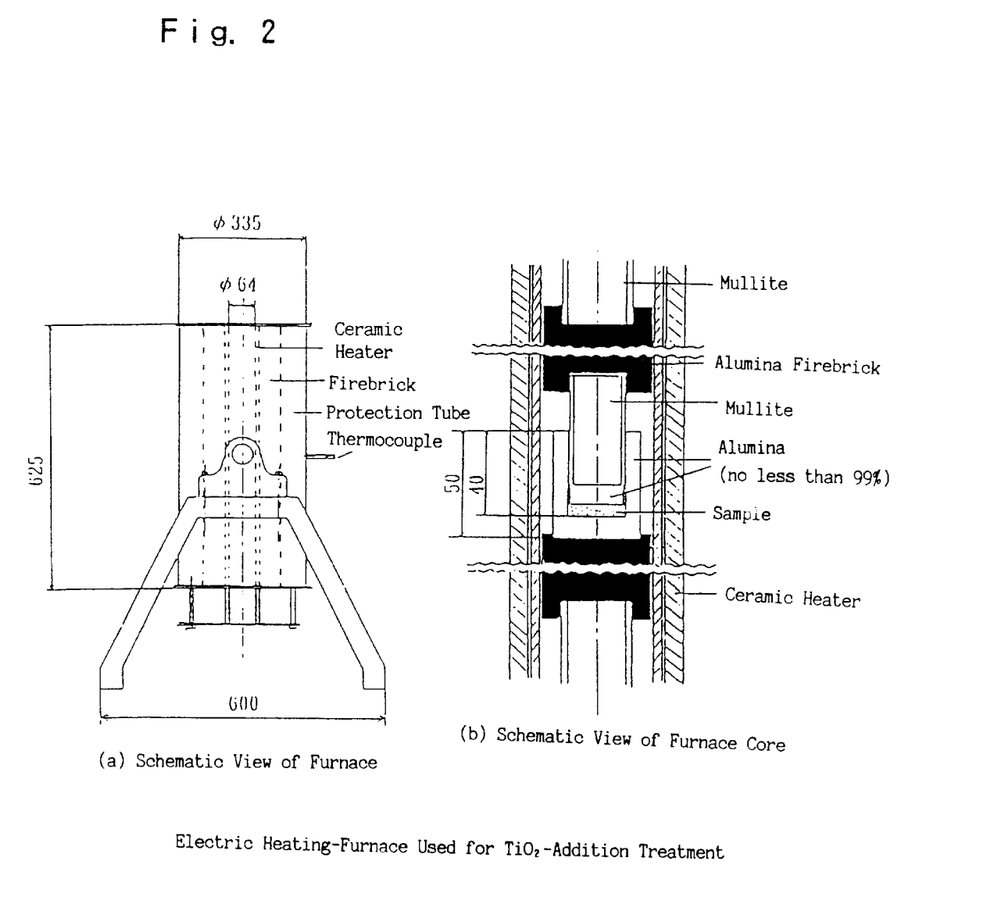
FIGS. 2 illustrate the structure of the electric heating furnace used for $TiO_2$-addition treatment in each example of the present invention.

In the following examples, the method ③ described above was adopted as a method for adding additives to alumina materials. Further, the description will be successively given to each case of adding $TiO_2$ or the like to: high purity WA abrasive particles; alumina ceramic cutting tools (so-called white ceramic tool) made by compressing and sintering fine particles of high purity aluminum oxide ($Al_2O_3$); general-use alumina ceramic materials obtained by adding a sintering agent to fine particles of aluminum oxide ($Al_2O_3$) for shaping thereof in a suitable manner and for subsequent sintering thereof; and single crystals of aluminum oxide (sapphire). For heat treatment, the electric heating furnace shown in FIG. 2 was used.

EXAMPLE 1

<high purity WA abrasive particles>

Table 1 shows the constituents and features of various kinds of abrasive particles. Of these abrasive particles, particulate WA abrasive having an aluminum oxide purity of no less than 99.5% was used in this example.

TABLE 1

Features of Various Abrasive Particles

| Symbol of Abrasive Particles | Constituents and Features |
|---|---|
| WA | white alumina abrasive particles containing no less than 99.5% of $Al_2O_3$ and no $Ti_2O_3$ |
| A | alumina abrasive particles containing about 95% of $Al_2O_3$ and a little $Ti_2O_3$ |
| PA | light purple alumina abrasive particles |
| C | black abrasive particles made by pulverizing ingots containing an ordinary purity of silicon carbide |
| GC | green abrasive particles made by pulverizing ingots containing a high purity of silicon carbide |

Figure 3:
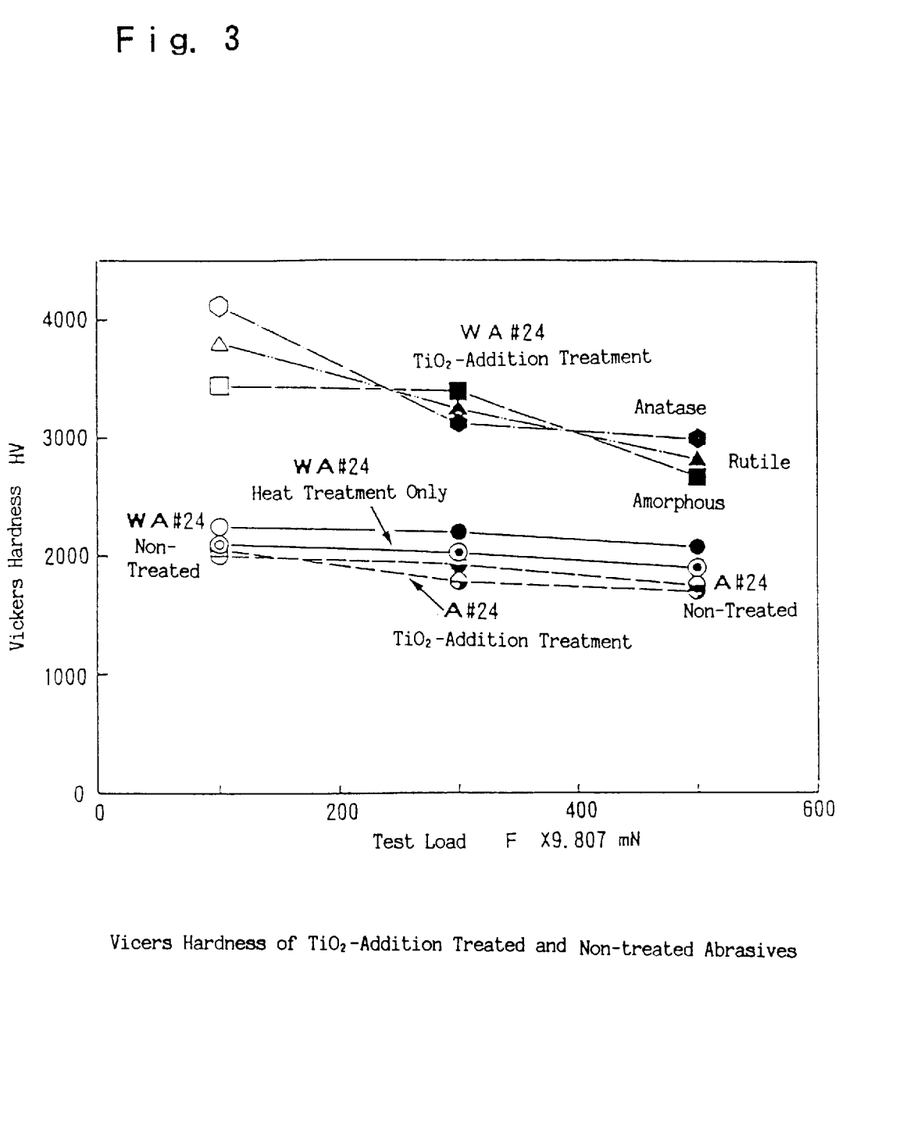
FIG. 3 is a graph showing the Vickers hardness of the WA abrasives treated by $TiO_2$-addition in Example 1 according to the present invention, in comparison with the Vickers hardness of various non-treated abrasives.

From "Dictionary of Technical Terms for Grinding & Polishing" (1972) edited by Particulate Abrasive Processing Society FIG. 3 is a graph illustrating a hardness increase of WA abrasive particles as a result of $TiO_2$-addition. For obtaining the results shown in this figure, the particulate WA abrasive was separately mixed with each of anatase, rutile and amorphous powder of $TiO_2$ and heated in the furnace of FIG. 2 at a temperature of 1573 K for 50 hours before taking out. Then, only the WA abrasive particles was picked up and embedded in resin, and the Vickers hardness of the particulate WA abrasive was measured by cross-sectional polishing thereof. For comparison, the same graph also shows the hardness of non-treated WA#24 abrasive particles, WA#4 abrasive particles subjected only to heat treatment at 1573 K for 20 hours, A#24 abrasive particles treated by $TiO_2$-addition at 1573 K for 20 hours, and non-treated A#24 abrasive particles in addition to the hardness of the WA#24 abrasive particles treated by $TiO_2$-addition in the above-described manner.

The measurements of the Vickers hardness were performed according to JIS R1610-1991 "Vickers Hardness Testing Method for Fine Ceramics". The measurements were performed under different test loads. However, when the test load was greater than 300 gf, cracks were often formed at corners of the Vickers indentation. Occurance of cracks is indicated by blackening of the points in the graph.

As shown in FIG. 3, "non-treated WA#24 abrasive particles" exhibited a Vickers hardness of about 2000 kgf/mm2, whereas "WA#24 abrasive particles treated by $TiO_2$-addition" exhibited an increased Vickers hardness of 3000-4000 kgf/mm2. In FIG. 3, "WA#24, Heat Treatment only" indicates that the WA abrasive particles were subjected only to heat treatment without embedment in $TiO_2$ powder, wherein the hardness of the abrasive particles did not increase to remain nearly as hard as "non-treated WA#24". Thus, it can be recongnized that the hardness of the abrasive particles does not increase by heat treatment alone.

Further, in FIG. 3, "A#24, $TiO_2$-Addition Treatment" indicates that the A abrasive particles were embedded in $TiO_2$ powder for heat treatment at 1573 K for 20 hours, which case provided substantially the same value as that of "non-treated A#24". Thus, it is confirmed that addition of $TiO_2$ to the A#24 abrasive particles does not provide a hardness increase.

Table 2, taken from JIS R6123-1987 "Explanation of Chemical Analysis Method for Alumina Abrasives", shows averages and ranges of impurities in abrasive particles as a result of experiments conducted by eight companies. This table shows that the amount of $TiO_2$ contained in WA abrasive particles is too small to be detected. $TiO_2$ contained in A abrasive particles is about 3%. Since the particulate A abrasive indicated by "A#24, $TiO_2$-addition treatment" contains no less than about 3% of $TiO_2$, addition of $TiO_2$ beyond about 3% will not provide a hardness increase. Therefore, the amount of $TiO_2$ to be added to the WA abrasive particles should be no more than 3% for hardness increase.

TABLE 2

Averages and Ranges of Experimental Results on Alumina Abrasives Conducted by Eight Companies

| Abrasive Particles | | Impurity Constituents (wt %) | | | | | | |
|---|---|---|---|---|---|---|---|---|
| | | $SiO_2$ | $Fe_2O_3$ | $TiO_2$ | CaO | MgO | $ZrO_2$ | $Na_2O$ |
| WA | x̄ | 0.018 | 0.019 | — | — | — | — | — |
| | R | 0.006 | 0.003 | — | — | — | — | — |
| A | x̄ | 0.807 | 0.105 | 2.984 | 0.087 | 0.157 | 0.192 | 0.389 |
| | R | 0.051 | 0.013 | 0.043 | 0.012 | 0.009 | 0.013 | 0.017 |
| PA | x̄ | 0.022 | 0.023 | — | — | — | — | 0.233 |
| | R | 0.001 | 0.004 | — | — | — | — | 0.020 | x: Averages of Eight Companies From JIS R6123-1987 p28
R: Range from the Averages "Explanation of Chemical Analysis Method for Alumina Abrasives"

Figure 4:
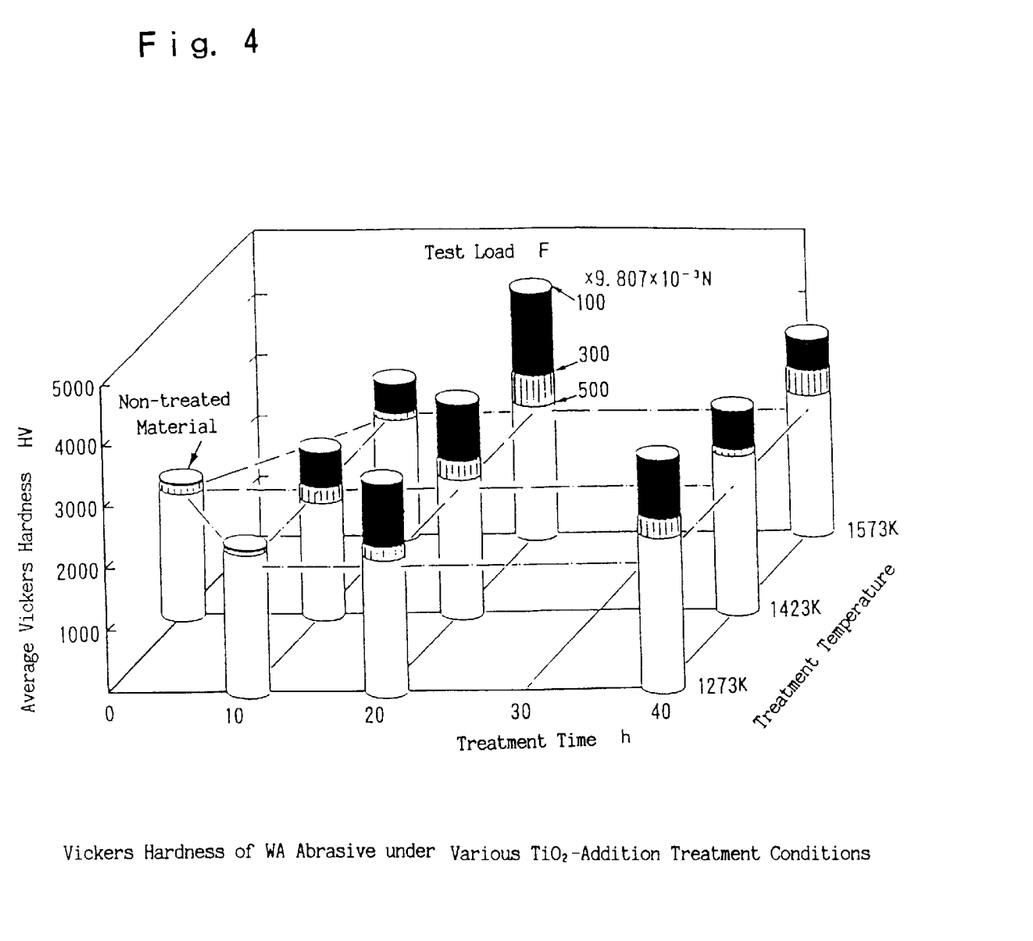
FIG. 4 is a graph showing the Vickers hardness of the WA abrasives treated by $TiO_2$-addition in Example 1 under different conditions.

FIG. 4 shows the results obtained by investigating the hardness increase of WA particles under different conditions of $TiO_2$-addition treatment. It has been found that the hardness increase becomes less as the high-temperature treatment time becomes longer, which means a longer treatment time at a high temperature results in an increase of $TiO_2$ to be added to the WA particles. Therefore, it is appreciated that there is a proper amount of $TiO_2$ to be added to the WA particles for realizing a desired hardness thereof. The proper amount is estimated to be no more than about 3%, as already discussed by referring to Table 2.

EXAMPLE 2

<White Ceramic Tool>

FIG. 5 shows an example wherein the hardness of an alumina ceramic cutting tool (so-called white ceramic tool) became larger by addition of $TiO_2$. The tool was made by compacting and sintering fine particles of high purity aluminum oxide ($Al_2O_3$). FIG. 5 shows the measurement results of the Vickers hardness at a surface of the white ceramic tool together with the results obtained for a non-treated tool. For measurement, the white ceramic tool was embedded in $TiO_2$ powder for heating at 1573 K for 20 hours in the furnace of FIG. 2 and then taken out for polishing at the cross section shown in FIG. 5. The measurement of the Vickers hardness was performed according to the above-described JIS method under a constant test load of 500 gf. It is appreciated from the same figure that the hardness of the tool treated by the $TiO_2$-addition increased to a maximum of about 3000 kgf/mm2 at the cross section which is about 1 mm deep from the surface, whereas the non-treated tool exhibited an uniform Vickers hardness of 1800 kgf/mm2 at any cross section.

Figure 6:
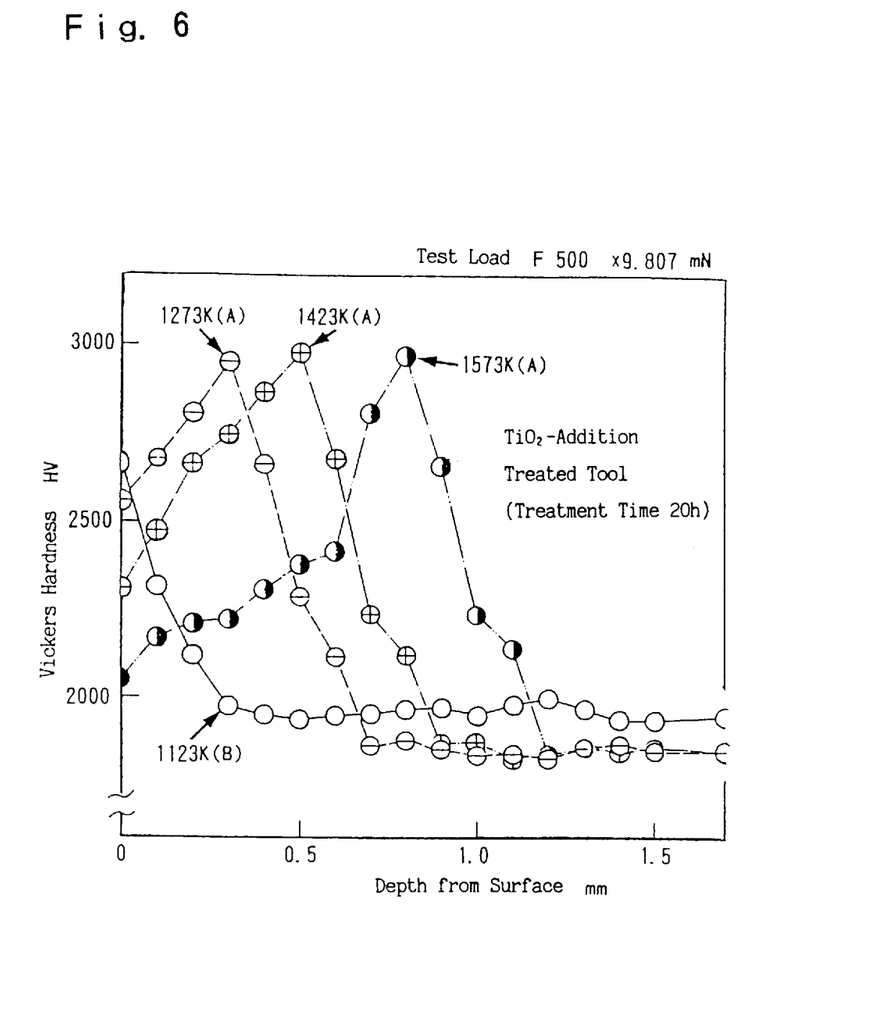
FIG. 6 is a graph showing the cross-sectional hardness distribution of white ceramic cutting tools treated by $TiO_2$-addition in Example 2 at different temperature conditions.
Figure 7:
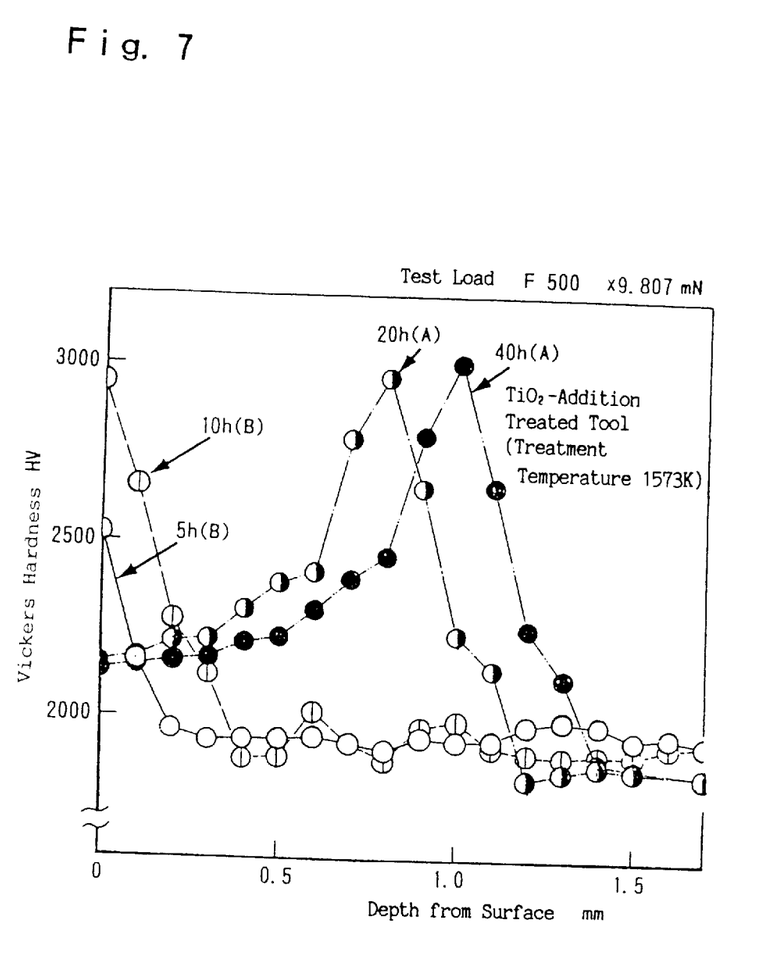
FIG. 7 is a graph showing the cross-sectional hardness distribution of white ceramic cutting tools treated by $TiO_2$-addition in Example 2 for different times.

FIGS. 6 and 7 show depthwise hardness distribution at a cross section of the tool to illustrate the influences of the $TiO_2$-addition treatment conditions on the hardness increase. It is appreciated from FIGS. 6 and 7 that the maximum hardness position shifts inward by adopting the treatment conditions which necessitate an increase of $TiO_2$ amount to be added to the tool surface. It is thus inferred that, in the case of the white ceramic tool as well, there is a proper amount of added $TiO_2$, which is estimated to be no more than about 3%, for realizing the maximum hardness of the sintered aluminum oxide cutting tool, like the abrasive described above.

Figure 8:
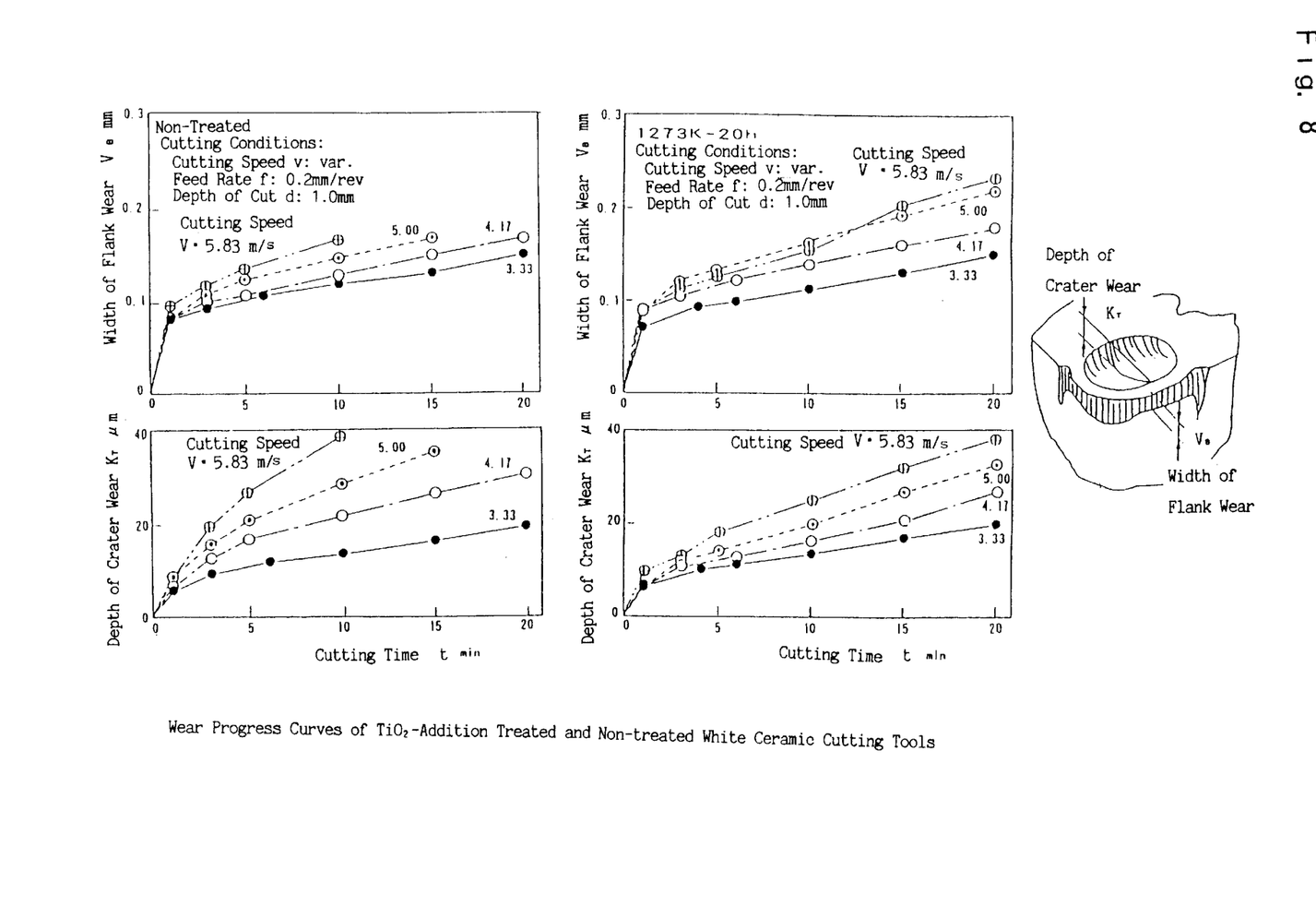
FIG. 8 gives graphs showing the wear progress curves of a white ceramic cutting tool treated by $TiO_2$-addition in Example 2 of the present invention and those of a non-treated white ceramic cutting tool.

FIG. 8 shows the results obtained by investigation as to wear progression with respect to a treated alumina ceramic cutting tool (so-called white ceramic tool) in comparison with a non-treated tool. The treated cutting tool was made to have an increased hardness by $TiO_2$-addition to sintered high-purity aluminum oxide ($Al_2O_3$), and used to cut structural carbon steel S55C at four different cutting speeds. The $TiO_2$-added tool was scarcely different in flank wear from the non-treated tool but provides less progression in crater wear. Thus, it is recognized that $TiO_2$-addition to this kind of ceramic tool restrains tool wear progression.

EXAMPLE 3

<Aluminum Ceramic Material>

Figure 9:
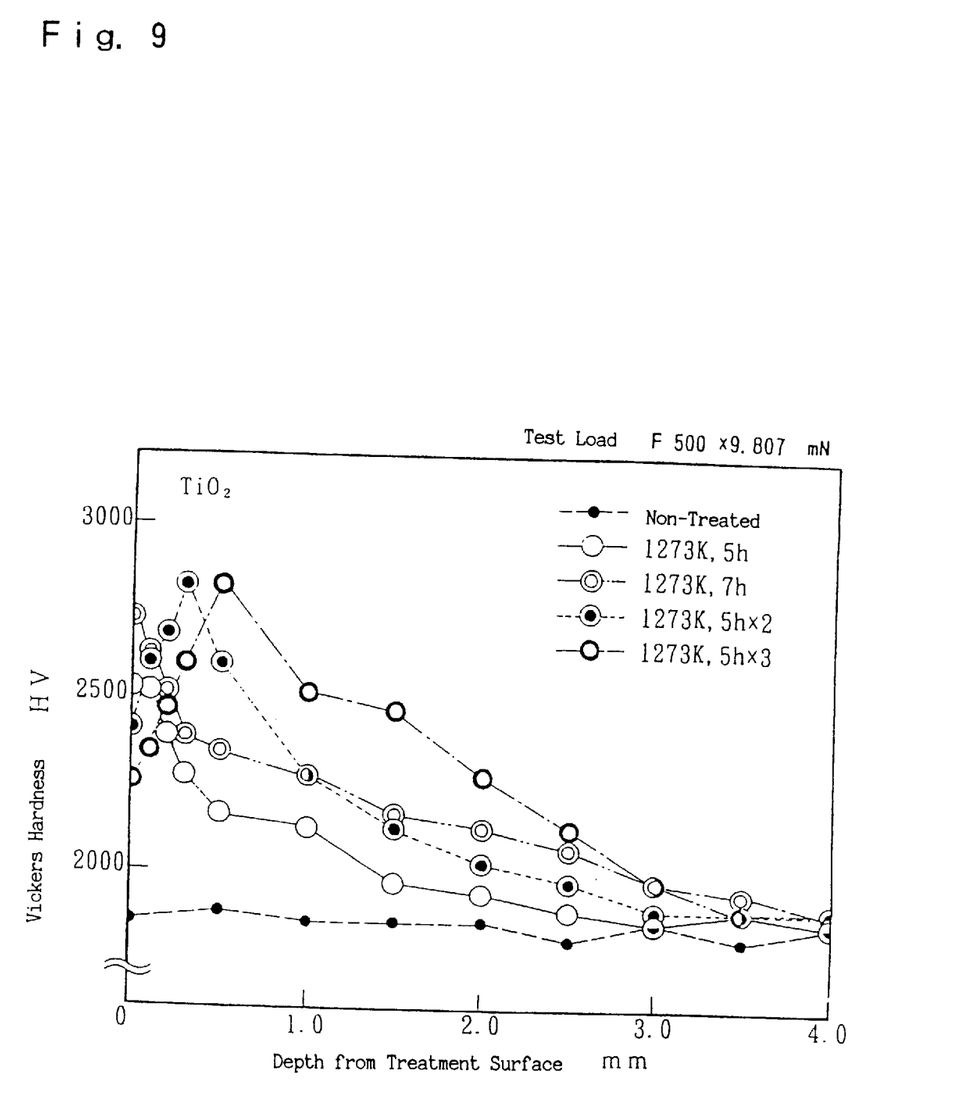
FIG. 9 is a graph showing the hardness distribution of an alumina ceramic material treated by $TiO_2$-addition in Example 3 of the present invention in comparison with that of the hardness distribution of a non-treated alumina ceramic material.

FIG. 9 shows how the hardness of a general-use alumina ceramic material increases by $TiO_2$-addition treatment. The alumina ceramic material was obtained by adding a sintering agent to fine particles of aluminum oxide ($Al_2O_3$) followed by suitably molding and sintering the aluminum oxide particles. The $TiO_2$-addition treatment was performed in the same manner as is the case with the above-described white ceramic tool except for the heating temperature and heating time. In contrast to a non-treated material, the maximum Vickers hardness near the surface of the $TiO_2$-added ceramic material becomes as great as 2800 HV. In this case again, the hardness peak shifts into the material from the surface as the heating time becomes longer. This is because $TiO_2$ will permeate into the material from its surface as the treatment time becomes longer, thereby causing the maximum hardness concentration portion (about no more than 3%) to gradually shift inward from the surface.

Figure 10:
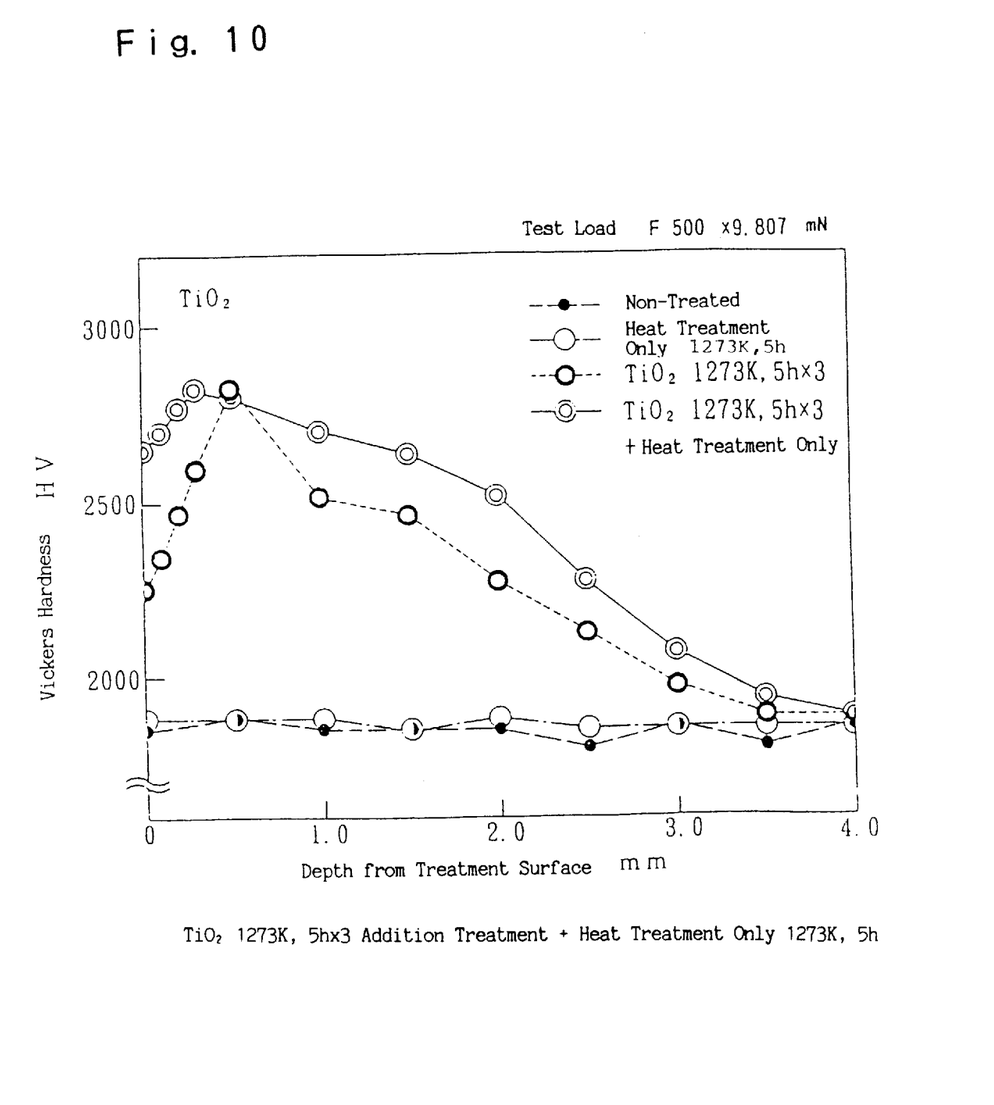
FIG. 10 is a graph showing comparison in hardness distribution between an alumina ceramic material treated by $TiO_2$-addition in Example 3 of the present invention and an alumina ceramic material subjected to additional heat treatment after $TiO_2$-addition treatment.

FIG. 10 shows the results obtained with a different $TiO_2$-addition treatment than that for FIG. 9, together with the results obtained by heat treatment alone. Specifically shown is comparison between a case where where $TiO_2$-addition treatment was performed at 1273 K for 5 hours three times and another case where $TiO_2$-addition treatment was performed at 1273 K for 5 hours three times followed by heat treatment alone at 1273 K for 5 hours. As seen in the same figure, if the $TiO_2$-addition treatment is followed by the heat treatment alone, the hardness distribution becomes gentle. This is presumably because the heating causes $TiO_2$ to permeate inward to make the $TiO_2$-concentration distribution gentle. Thus, by performing such a two-stage treatment, it is possible to increase the thickness of the hardened surface layer.

Figure 11:
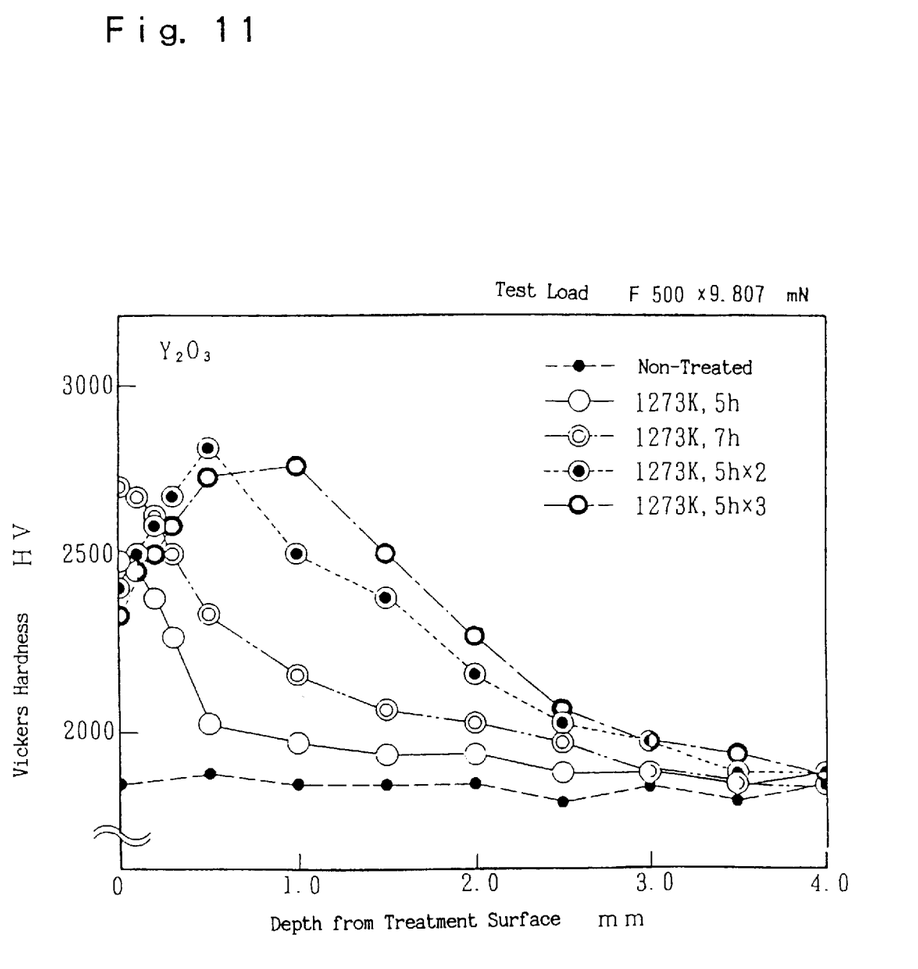
FIG. 11 is a graph showing the hardness distribution of alumina ceramic materials treated by $Y_2O_3$-addition in Example 3 of the present invention, in comparison with a non-treated material.

FIG. 11 shows the hardness increase obtained by addition of $Y_2O_3$ to general-use alumina ceramic materials similar to the one described above. As seen from the same figure, the $Y_2O_3$-addition treatment provides a maximum Vickers hardness of as great as 2800 kgf/mm2 near the surface of of the ceramic material, as opposed to a non-treated case. In this case again, the hardness peak shifts inward from the surface as the total treatment time becomes longer. This is also because $Y_2O_3$ will permeate into the material from its surface as the treatment time becomes longer, thereby causing the maximum hardness concentration portion (about no more than 3%) to gradually shift inward from the surface.

Figure 12:
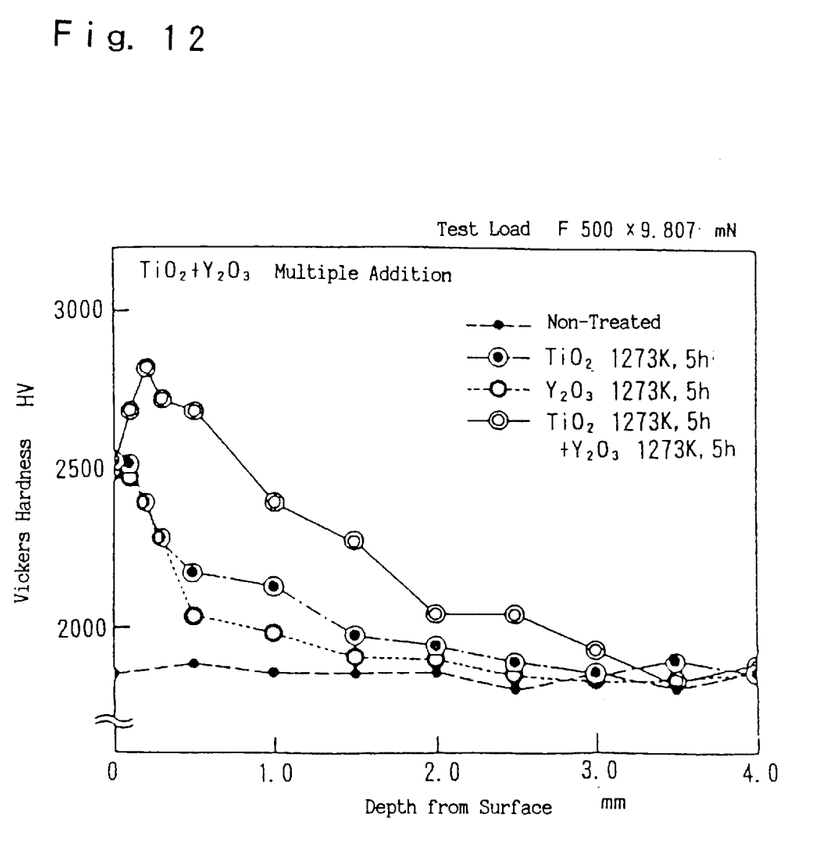
FIG. 12 is a graph showing the hardness distribution of an alumina ceramic material treated by combined addition of $TiO_2$ and $Y_2O_3$ in Example 3 of the present invention.

FIG. 12 shows hardness distribution with respect to similar general-use alumina ceramic materials which were respectively treated as follows: ①$TiO_2$-addition treatment at 1273 K for 5 hours; ②$Y_2O_3$-addition treatment at 1273 K for 5 hours, and ③$TiO_2$-addition treatment at 1273 K for 5 hours followed by $Y_2O_3$-addition treatment at 1273 K for 5 hours. As can be seen from the same figure, a portion near the surface of the ceramic material can be properly hardened by adding different additives in combination as long as the additives are solid-soluble in the ceramic material for hardening thereof.

EXAMPLE 4

<Single Crystal of Aluminum Oxide (sapphire)>

FIG. 13 shows the surface hardness of a single crystal (sapphire) of aluminum oxide ($Al_2O_3$) which was treated by $TiO_2$-addition, in comparison with non-treated crystals. As seen from the same figure, the $TiO_2$-addition treatment provided a Vickers hardness increase to 3000–4000 kgf/mm2. The single crystal of aluminum oxide thus treated by $TiO_2$-addition was polished into a cutting tool which provided a remarkably lower tool wear than a non-treated cutting tool when tested for cutting a ferrous metal.

Figure 14:
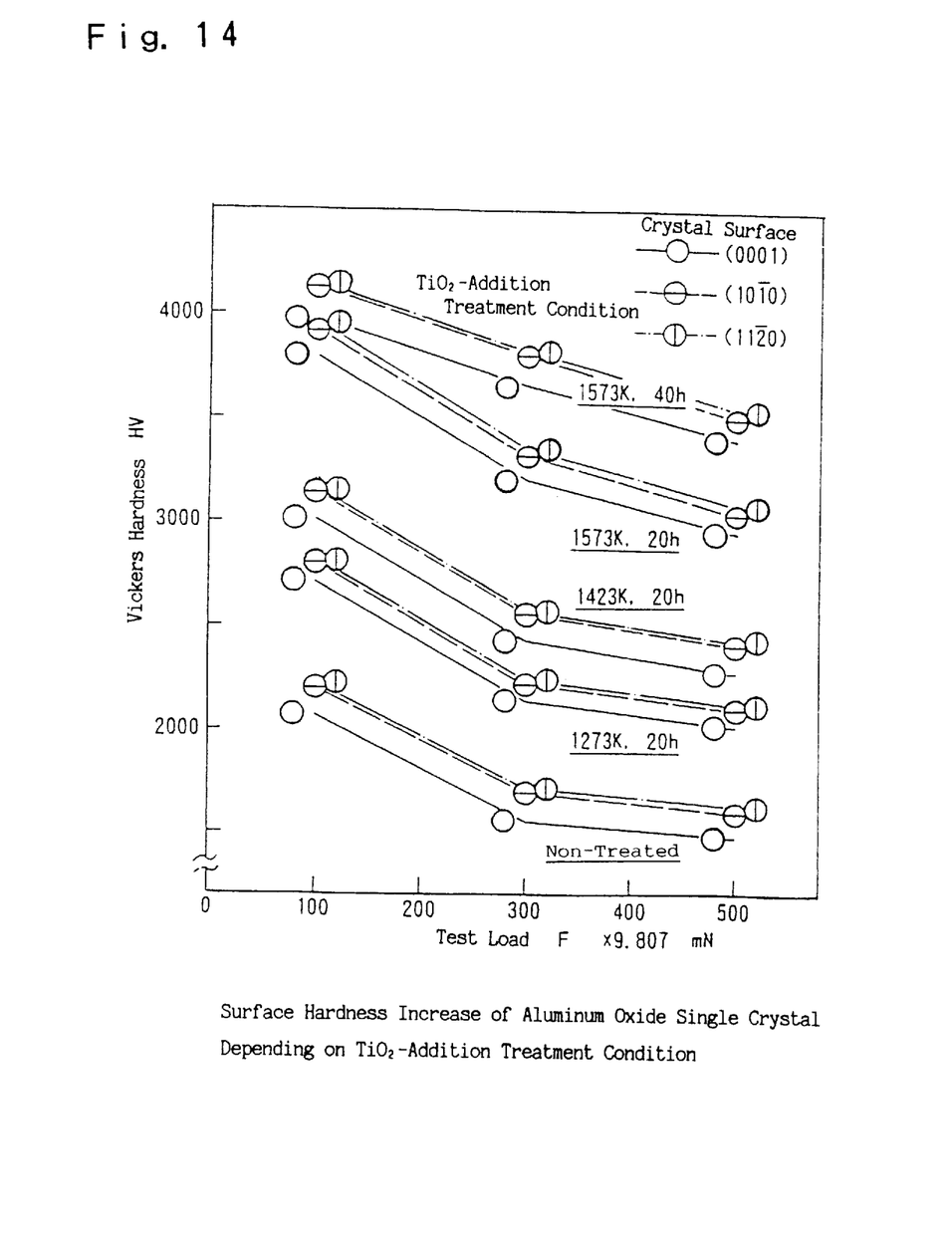
FIG. 14 is a graph showing how the surface hardness of single crystals of aluminum oxide increases depending on the conditions for $TiO_2$-addition treatment in Example 4.

FIG. 14 shows the measurement results with respect to the crystal surface hardness under various conditions of $TiO_2$-addition treatment. Within the range of the tests, the surface hardness increased as the treatment temperature became higher and the treatment time became longer.

Figure 15:
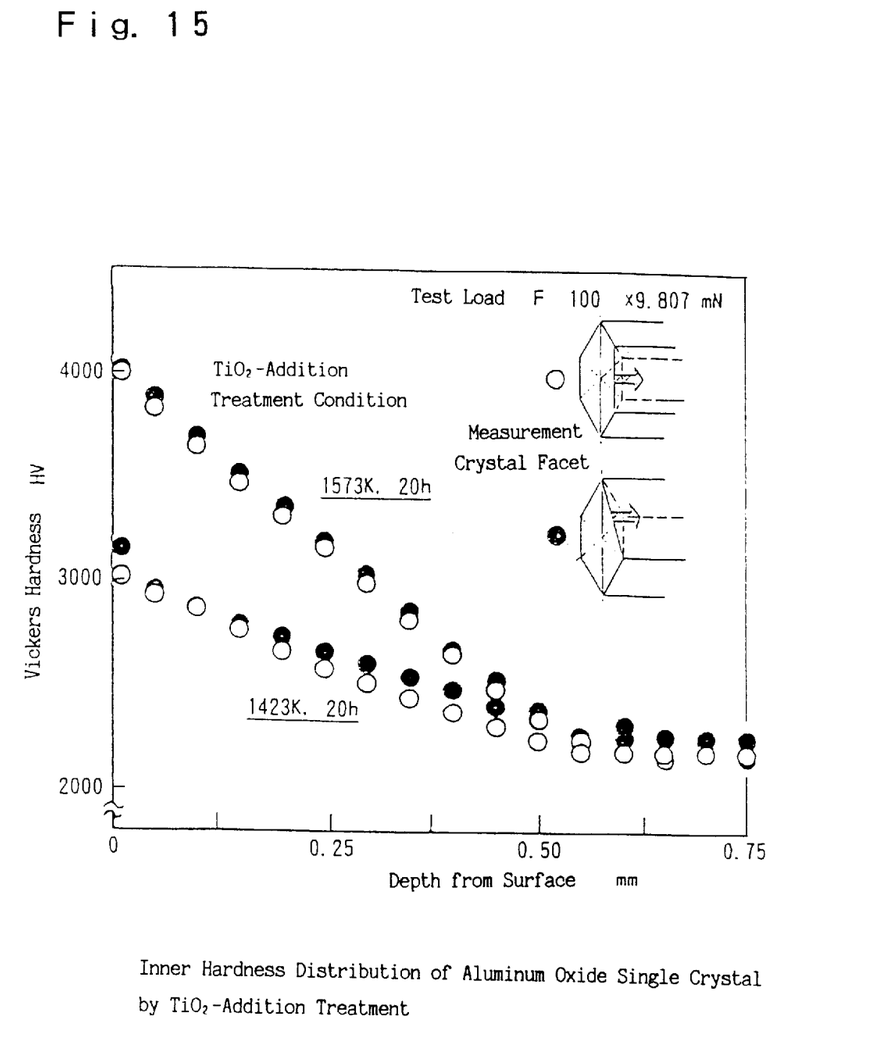
FIG. 15 is a graph showing the internal hardness distribution of single crystals of aluminum oxide treated by $TiO_2$-addition in Example 4.

FIG. 15 shows the results obtained by investigating the hardness distribution inside the crystal. In this investigation, two crystal facets were subjected to addition treatment under two different treatment conditions. There was substantially no difference between the two facets, and a higher hardness was provided closer to the surface as long as the tests revealed.

Of course, the scope of the present invention covers not only any alumina materials which consists mainly of alumina oxide but also any products such as tools made of such a material, regardless of forms. Further, surface hardening of the above-described materials or the like may be facilitated by adding $TiO_2$ or other alumina-soluble additive to a given solid alumina material according to the method "③" above. Alternatively, the addition treatment may be performed by method "①" or "②" above during a tool-forming process. In any case, it is necessary to perform a heat treatment for a predetermined time at a predetermined temperature to properly dissolve the additive in alumina. As evident from the above examples, the former method hardens white ceramic tools, sapphire or the like only in the vicinity of the surface. On the other hand, the latter method provides uniform hardening inside the material or product. In the latter case, it is important to set the concentration of the additive at 3% or below for realizing a proper hardness increase.

Measurements of micro-Vickers hardness vary slightly depending on the test load. Normally, for an identical specimen, a hardness value measured under a smaller test load is larger than that measured under a greater test load. Therefore, a specimen which provides a measurement of 2600 kgf/mm2 under a test load of 500×9.807 mN for example will give a measurement of 2600 kgf/mm2 or more under a test load of 300×9.807 mN, presumably over 3000 kgf/mm2 in consideration of the tendency shown in FIG. 14.

As described above, according to the present invention, it is possible to increase the hardness of an alumina material or product to as high as 2600–4000 kgf/mm2 from a conventionally highest value of 2000 kgf/mm2 . As a result, the hardened alumina material of the present invention, when applied to make an abrasive, a cutting tool or a ceramic product, provides a remarkably prolonged service life or a quality enhancement of the alumina ceramic product. Thus, the industrial significance of the present invention is exceptionally great.

I claim:

1. A hardened alumina material containing aluminum oxide as a main component, wherein the material is at least partially hardened to have a micro-Vickers hardness of no less than 2600 kgf/mm2 (under a test load of 300×9.807 mN) by solid solution of an oxide additive in aluminum oxide, the oxide additive being selected from the group consisting of $TiO_2$ and $Y_2O_3$, a hardened part of the alumina material containing no more that 3% of the oxide additive, the alumina material containing no sol- and gel-forming agent.

2. The hardened alumina material according to claim 1, wherein a hardened part of the alumina material contains no more than 2.5% of the oxide additive.

3. The hardened alumina material according to claim 1, wherein the alumina material comprises hardened white alumina abrasive particles whose purity is no less than 99.5%.

4. The hardened alumina material according to claim 1, wherein the alumina material comprises a hardened aluminum-based ceramic compact made by sintering aluminum oxide.

5. The hardened alumina material according to claim 1, wherein the alumina material comprises a hardened single crystal of aluminum oxide.

* * * * *